United States Patent Office 3,654,069
Patented Apr. 4, 1972

3,654,069
POLYSTYRENE LAMINATE AND ADHESIVE-COATED FILM FOR LAMINATION TO POLYSTYRENE
Bertram B. Freudenberg, Wilmington, Del., assignor to Rohm and Haas Company, Philadelphia, Pa.
No Drawing. Filed Nov. 12, 1969, Ser. No. 876,117
Int. Cl. B32b 27/08; C09j
U.S. Cl. 161—254                             8 Claims

ABSTRACT OF THE DISCLOSURE

Polystyrene sheet can be provided with a decorative and/or protective film coating by utilization of a styrene/acrylonitrile polymer adhesive and a film having a predominantly methacrylate polymeric surface. The preferred laminate combines high impact polystyrene having laminated thereto a film consisting of a heterogeneous polymeric composition having a predominantly methacrylate continuous phase with cross-linked predominantly acrylate polymer dispersed therein. The film coated with adhesive is of particular use in that it can be continuously applied to the substrate at the time of extrusion of the substrate.

This invention relates to a method for laminating film to polystyrene and to the laminated product.

Polystyrene is a highly desirable material for many uses both by virtue of its excellent physical properties and its ready economic availability. For any of a number of reasons, however, it is desirable to modify one or more surfaces of polystyrene sheeting by the application thereto of a film of another material. This may, for example, be for the purpose of obtaining special decorative effects or it may be for the purpose of providing protection for the polystyrene substrate. Thus, for example, polystyrene when subjected to severe weathering conditions may degrade to an extent to preclude its economical utilization. In some instances, it may be desirable to apply a film containing an ultraviolet light absorber. Additionally, it may be desirable to coat the polystyrene substrate with pigmented films.

Attempts to laminate films to polystyrene substrates have not proved generally successful. Apparently, the surface characteristics of polystyrene, and particularly high impact polystyrene, are such that many films cannot be either mechanically or chemically attached to the substrate. Continuous extrusion lamination operations, with or without the use of various adhesives, have been found to produce a poor bond. Further, the bond between the polystyrene and film has been found to be so weak that delamination frequently occurs during ordinary handling and processing techniques.

It has now been found that an adhesive consisting essentially of a styrene-acrylonitrile interpolymer can be utilized to bond a predominately methyl methacrylate film to polystyrene. The adhesive composition of the present invention comprises a polymer consisting essentially of at least 65% by weight styrene, at least 3% acrylonitrile and the balance at least one member selected from the group consisting of acrylic acid, methacrylic acid and the alkyl esters of said acids wherein the alkyl substituent has up to 8 carbon atoms. The amount of acid or corresponding alkyl ester included in the polymer is such that the glass temperature of the polymer is at least 60° C. The polymer has an intrinsic viscosity as measured in ethylene dichloride in the range of 0.2 to 0.9. Thus, the adhesive polymer can range from a 65% styrene/35% acrylonitrile copolymer to a 97% styrene/3% acrylonitrile copolymer or may vary between said limits with the addition of the acrylic monomer specified, provided the polymer meets the other requirements with regard to softening point and intrinsic viscosity. It is, or course, within the skill of the art to select additional components from the above mentioned group and to determine the amount to give the specified physical properties. Typical of such monomers, in addition to the free acids, are methyl, butyl and 2-ethyl hexyl methacrylates and acrylates. Further, mixture of those with each other and/or with acrylic or methacrylic acid can also be employed within the limits indicated.

The polystyrene substrate contemplated for the purposes of the present invention includes linear polystyrene in the range of about 100,000 to about 300,000 molecular weight. In general, the polystyrene becomes too brittle at lower molecular weights and is too stiff to process at higher molecular weights. As employed herein, the term "polystyrene" is intended to include the various styrene polymers recognized by the art as essentially equivalent to polymer obtained from commercial styrene and thus includes polystyrenes containing α-methylstyrene, etc., in the base composition. In addition, unless otherwise indicated, the term "polystyrene" is intended to include the elastomeric-modified polystyrenes commonly referred to in the art as "high impact polystyrene." For the purposes of the present invention, high impact polystyrene, the preferred substrate, is the "toughened polystyrene" described in Encyclopedia of Polymer Science and Technology, v. 7, pp. 612–614, Wiley and Sons (1967). Library of Congress No. 64–22188.

The overall characteristics of the film to be laminated to the polystyrene are not of critical importance in the present invention; only the characteristics of the film bonding surface are critical. The film bonding surface, i.e., the film interface in the final laminate, for the purposes of the present invention comprises a polymeric material of a predominant amount of at least one alkyl methacrylate wherein the alkyl substituent contains from 1 to 4 carbon atoms and the balance at least one member selected from the group consisting of acrylic acid, methacrylic acid, alkyl acrylates wherein the alkyl substituent contains from 1 to 8 carton atoms and alkyl methacrylates wherein the alkyl substituent contains from 5 to 9 carbon atoms, with the proviso that the polymer has a glass transition temperature above 30° C., preferably above 60° C., and particularly in the range of about 60° C. to 80° C. The polymer shall be formable into free film and should be non-blocking at storage temperature (e.g., no appreciable blocking at temperatures up to 150° F. when film is subjected to a pressure of 6 p.s.i.; for 16 hours). As will be apparent from the foregoing, the film bonded to the polystyrene substrate may be of homogeneous composition corresponding to the bonding surface or may vary from the bonding surface through the film to the outer surface. Additionally, the film may be heterogeneous, i.e., may have a discontinuous phase of different composition, e.g., pigments, fillers, or elastomeric polymers, dispersed in a continuous phase of composition corresponding to that of the film bonding surface.

Further, any of the above films may be laminates, with the film surface opposite the film bonding surface bonded to a still different film or sheet material, e.g., to aluminum foil, polyvinyl chloride, etc. The films may be pigmented or unpigmented and/or may contain modifiers and the like, e.g., ultraviolet light stabilizers. Finally, and quite significantly, the film can be printed over part or all the surface which is to be bonded to the polystyrene substrate without significant effect on the film-to-substrate bond, particularly where the printing ink comprises an acrylic polymer base.

The laminates of the present invention can be fabricated in any convenient fashion, and by any of the techniques presently available in the prior art. For example, the adhesive can be applied to the bonding surface of the methacrylate film as a melt or as a solution and the film then applied to the surface of the polystyrene sheet with heat and pressure to provide the bonding. Such technique, i.e., wherein the adhesive is first coated on the film and the adhesive-coated film is then laminated to the polystyrene substrate, is preferred, primarily as a matter of convenience, since the adhesive is most readily applied in this fashion, and handling problems are minimal. Under appropriate circumstances, the substrate, adhesive and film can be brought together substantially simultaneously, in a single operation, e.g., by simultaneous extrusion of the three components in proper register, or by the usual lamination techniques with preformed films and substrate.

Extrusion coating of a melt of the adhesive onto the film is effective, wherein a melt of the adhesive, e.g., at about 300 to 480° F., is extruded into a thin film, e.g., on the order of about 0.5 mil, and the film is contacted with the methacrylate film and then passed through a pair of nip rolls heated to at least about 200° F., preferably 225° F. to 260° F. The higher temperature of the nip rolls provides more complete bonding of the adhesive to the film. In the melt extrusion coating technique, an adhesive film thickness of about 0.5 mil is about the thinnest that can be obtained with good control, although thinner coatings are desirable. Thicker coatings in general merely add to cost without contributing to bond strength and, in addition, introduce excessive brittle material into the laminate.

Where thinner adhesive layers are desired, a solution of the adhesive, e.g., at 30% solids, is applied to the methacrylate film, and the solution coating is dried at elevated temperature to remove the solvent and to bond the adhesive to the film. The adhesive is dissolved in a suitable solvent, such as xylene, hexane, acetone, methyl ethyl ketone, and the like, and frequently in a mixture of two or more of such solvents at a convenient solids content and solution viscosity for the coating operation. The solution is applied in an amount sufficient to provide an adhesive coating, preferably of about 0.1 to 0.4 mil thickness. Utilizing gravure coating equipment, the adhesive solution can be applied extremely rapidly and can be dried at a temperature of about 175 to 220° F., preferably about 190° F., without significant shrinking or wrinkling of the methacrylate film.

For the extrusion coating technique, it is preferred to use an adhesive polymer having an intrinsic viscosity of 0.4 to 0.9. For the solution coating technique, the adhesive polymer should have an intrinsic viscosity of 0.2 to 0.4.

The adhesive-coated film is suitably laminated to the polystyrene substrate at elevated temperatures and under pressure. A preferred technique is an extrusion lamination operation whereby polystyrene is extruded from a melt to form a rigid sheet of appropriate thickness, and is contacted on one or both surfaces with the adhesive-coated side of the methacrylate film.

A significant feature of this invention is the fact that the extrusion lamination involves essentially no change in conditions or technique from those normally used for extruding plastic sheet. Thus, the laminate can be passed through heated nip rolls to secure bonding of the adhesive to both the film and the rigid sheet. The polystyrene can be extruded from a melt, typically, at about 350 to 450° F., through a die having a gap of the desired thickness into the nip of take-off rolls. The coated film is fed into the nip and into contact with the polystyrene sheet and the laminate bond is formed at a temperature of about 200 to 250° F., preferably about 215 to 225° F., and a pressure of about 50 to 100 p.s.i., preferably about 75 p.s.i.

One type of film material useful for the purposes of the present invention is described in detail and claimed in U.S. 3,415,796. Films particularly useful in the contemplation of that patent include (a) a bulk polymerization homopolymer of ethyl methacrylate with 0.75 melt index and a glass transition temperature of 65° C. which has been extruded and blown into a tubular film at a die temperature of 450° F. and (b) a polymerized copolymer of 75% by weight methyl methacrylate and 25% by weight ethyl acrylate having a melt index of 1.0 and a glass transition temperature of about 60° C. and which has been extruded and blown into tubular film at a die temperature of 480° F.

Another example of the film material useful for the purposes of the present invention, and the preferred material as will be shown subsequently, is that described and claimed in U.S. application 526,038, now abandoned. This material consists essentially of a rubbery, cross-linked poly(alkyl acrylate) having a maximum glass transition temperature of not over —20° C. dispersed in a continuous phase of a predominately methacrylate polymer generally containing minor amounts of acrylates and/or acrylic acid and methacrylic acid copolymerized therewith.

A third film useful for the purposes of the present invention is described and claimed in U.S. 3,473,996 of Whalen and comprises a binary laminate of a film such as that first described above to film of the type secondly described above or a ternary laminate wherein, for example, a vinyl chloride and/or vinyl acetate polymer or copolymer film is laminated to the rubbery polymer film of the binary laminate. In the case of the binary laminate, either side may be further laminated in accordance with the present invention to the polystyrene substrate. With regard to the ternary laminate, only the predominately methacrylate film side should be further laminated to the polystyrene substrate.

The present invention will be illustrated by reference to the preferred embodiment wherein the film is prepared from a resin in which a rubbery polymer is dispersed in a predominately methacrylate polymer. This preferred material is formed by emulsion polymerization in four stages (approximately the same amount of monomer fed in each stage) of the following monomers:

Stage:
1 ----- 100% butyl acrylate with about 1% by weight butylene glycol diacrylate as cross-linker.
2 ----- About 40% butyl acrylate. 60% methyl methacrylate.
3 ----- About 10% butyl acrylate. about 90% methyl methacrylate.
4 ----- About 2% butyl acrylate. about 98% methyl methacrylate, about 4% (based on acrylate and methacrylate) of methacrylic acid.

The films utilized in the examples which follow were extruded from the above polymer which had a melt index of 0.8. These films are designated as follows:

TABLE 1

Film type

Film Number:
I ----------- Two mil clear film.
II ----------- Three mil unpigmented film containing 1% of a benzotriazole ultraviolet stabilizer (Tinuvin-327, a product of Geigy Chemical Corporation).
III ----------- Polymer mixed with 15 parts titanium dioxide pigment per 100 parts of polymer, extruded to three mil film.

In the examples which follow, the high impact polystyrene resins utilized as the substrate are as follows:

TABLE 2

Substrate Characteristics

Substrate Number:
- W...... Dow Styron 456: Sp. G. (23/23° C.) of 1.04; Vicat softening point of 211° F.; Izod impact strength (notched, 23° C.), of 1.4 ft.-lbs.
- X...... Dow Styron 475B: Sp. G. (23/23° C.) of 1.05; Vicat softening point of 198° F.; Izod impact strength (notched, 23° C.), of 1.2 ft.-lbs.
- Y...... Union Carbide TGD 5006: Sp. G. (23/23° C.) of 1.03; Vicat softening point of 180° F.; Izod impact strength (notched, 23° C.), of 1.2 ft.-lbs.
- Z...... Union Carbide TGD 5161: Sp. G. (23/23° C.) of 1.03; Vicat softening point of 214° F.; Izod impact strength (notched, 23° C.), of 1.0 ft.-lb.

A number of styrene-acrylonitrile polymers were prepared and applied to film of the preferred composition as described previously. In all instances, the films were satisfactorily bonded to high impact polystyrene, and a strong bond and laminate resulted. For bulk polymerization, the monomer mixture and usual bulk polymerization additives are mixed, filtered and degassed. For a typical 95/5% styrene acrylonitrile polymer, the polymerization mixture is maintained at about 70–72° C. until hard (about 45–50 hours) and then held for two hours at 80° C., and finally for six hours at 120° C. The polymer is cooled, granulated and, if desired, dissolved in a solvent such as xylene/acetone/hexane:43/31/26 at 35% concentration. For solution polymerization, a solution of 52.26% styrene, 2.74% acrylonitrile and 44.44% xylene (plus usual polymerization additives) is mixed and charged into a suitable reactor equipped with stirrer and condenser. Following the usual solution polymerization technique, the reaction mixture is heated at about 70° C. for 20 hours, at about 85° C. for 10 hours, and finally at about 110° C. for 14 hours. The resulting product is a polymer solution at about 55% concentration which can be diluted with acetone and hexane to the desired concentration. In general, the adhesive was prepared by heating the monomer mixture to the boiling point in a closed reaction vessel until a solid mass formed. The temperature was then increased to 210° C. and maintained at that level for about 2 hours. The resulting polymer was granulated and pelletized. The adhesive and the method of coating the polymer on the film are described in the following table. Certain samples in the table have been provided with letter designations for use in subsequent examples to designate the adhesive. In general, the extrusion coating of the adhesive on the film is effected with a melt temperature in the range of 315° F. to 380° F., typically 330° F., with a nip roll temperature in the range of 260° F. to 290° F., typically 260° F., and a nip roll pressure in the range of 75 to 127 p.s.i., typically 120 p.s.i., to provide an adhesive coating in the range of 0.4 to 0.7 mil, typically 0.6 mil.

The films of Table 1, substrates of Table 2 and adhesives A and B of Table 3 were laminated in various combinations with an extrusion die temperature in the range of 375° F. to 400° F. (generally 390° F. or 400° F.), nip roll temperature in the range of 200° F. to 235° F. (generally about 220° F.), and a nip pressure in the range of 15 to 75 p.s.i. (typically at 75 p.s.i.). The resulting laminates were subjected to knife peel tests to measure the adhesion of the film to the substrate. The measurements were made on the initial laminate, on the laminate after three cycles of 30 minutes at −10° F. followed by 30 minutes at 160° F., and on the laminate after 10 days of immersion in water at 140° F. (determined on the laminate after 5 minutes and after 16 hours of drying at room temperature). Similar tests were conducted on adhesive-free film-polystyrene substrate laminates. The laminate without adhesive was consistently rated as "easily peeled" for all tests. Those made utilizing the adhesive were, for the most part, rated "non-peeling"; none of the adhesive-bonded laminates were rated "easily-peeled" even after the thermal and immersion cycles.

TABLE 3

| Designation in Examples | Styrene, percent | Acrylonitrile, percent | Other compound | level, percent | Polymerization technique | Estimated intrinsic viscosity [1] | Film coating technique |
|---|---|---|---|---|---|---|---|
| A | 95 | 5 | | | Bulk | 0.75 | Extrusion. |
|   | 95 | 5 | | | do | 0.87 | Solution.* |
|   | 95 | 5 | | | do | 0.85 | Extrusion. |
|   | 95 | 5 | | | do | 0.85 | Solution.* |
|   | 95 | 5 | | | do | 0.73 | Extrusion. |
| C | 95 | 5 | | | Bulk | 0.71 | Extrusion. |
|   | 95 | 5 | | | do | 0.67 | Solution.* |
|   | 95 | 5 | | | do | 0.62 | Extrusion. |
|   | 95 | 5 | | | do | 0.58 | Do. |
|   | 95 | 5 | | | Bulk | 0.57 | Extrusion. |
| B | 95 | 5 | | | do | 0.57 | Extrusion and solution.* |
|   | 95 | 5 | | | do | 0.54 | Solution.* |
|   | 95 | 5 | | | Bulk | 0.50 | Extrusion.* |
|   | 95 | 5 | | | do | 0.47 | Solution.* |
|   | 95 | 5 | | | do | 0.45 | Do.* |
|   | 95 | 5 | | | Solution | 0.40 | Do.* |
| D | 95 | 5 | | | Bulk | 0.39 | Do.* |
|   | 95 | 5 | | | do | 0.37 | Do.* |
|   | 95 | 5 | | | Solution | 0.37 | Do.* |
|   | 95 | 5 | | | Bulk | 0.30 | Do.* |
|   | 95 | 5 | | | Solution | 0.24 | Do.* |
|   | 95 | 5 | | | do | 0.20 | Do.* |
|   | 90 | 10 | | | Bulk | 0.59 | Extrusion. |
| E | 93 | 5 | EA [2] | 2 | do | 0.70 | Do.* |
|   | 90 | 5 | EA | 5 | do | 0.69 | Do.* |
| F | 90 | 5 | EA | 5 | Bulk | 0.55 | Extrusion. |
|   | 85 | 5 | EA | 10 | do | 0.62 | Do.* |
| G | 85 | 5 | EA | 10 | Bulk | 0.52 | Extrusion. |
|   | 75 | 5 | EA | 20 | do | 0.60 | Do. |
|   | 75 | 5 | EA | 20 | Bulk | 0.57 | Extrusion. |
|   | 70 | 5 | EA | 25 | do | 0.60 | Do. |
| H | 92 | 5 | BMA [3] | 3 | do | 0.71 | Do. |
|   | 90 | 5 | BMA | 5 | do | 0.67 | Do. |
|   | 80 | 5 | BMA | 15 | do | 0.59 | Do. |
|   | 93 | 5 | G-30 [4] | 2 | do | 0.66 | Do. |
|   | 90 | 5 | G-30 | 5 | do | 0.63 | Do. |
| K | 92 | 5 | MAA [5] | 3 | Bulk | 0.40 | Extrusion. |

[1] Ethylene dichloride, dl./gm.
[2] Ethyl acrylate.
[3] Butyl methacrylate.
[4] Paraplex G-30, Rohm and Haas Company (plasticizer).
[5] Methacrylic acid.
*Contains 1% fo U.V. stabilizer.

To illustrate the broad range of useful adhesive compositions, adhesives A, B, D, E, F, G, H, and K were utilized to bond film III to substrates W and Z. The resulting laminates were subjected not only to thermal cycling and water immersion but also to Fog Exposure Test ASTM D-2247, Salt Spray Exposure Test ASTM B-117, a water-soak test (1000 hours at room temperature) a humidity blush test (1000 hours at 100° F.) and a boiling water delamination test (4 hours at 100° C.). All of the samples exhibited essentially no peeling or blistering under the condition of the tests. (Adhesion was determined in the manner described previously.)

Laminates produced as described above, and the corresponding unlaminated polystyrene substrate were subjected to standard mechanical tests including dimensional stability, tensile (ASTM D-638), tensile impact (ASTM D-1822), Izod (ASTM D-256), Charpy (ASTM D-256B) and a reverse impact test. The laminates, in many instances, exhibited a slight reduction in desirable mechanical properties although not a significant reduction in terms of the intended uses of the laminates. The substantial gains in other desirable properties more than compensate for the slight decrease in mechanical properties.

One important requirement for effective utilization of these laminates is a demonstrated capability to be thermoformed without delamination. These laminates have been drawn down to 7% of initial thickness; while the adhesion of the laminate decreased with drawing, it did not decrease to the "easily peeled" rating found with undrawn laminates prepared without the adhesive. In general, however, the laminates should not be subjected to a draw-down below about 20% of initial thickness.

To further illustrate the ease of carrying out the present invention, adhesive B was dissolved in a xylene-acetone-hexane mixture (weight ratio of 1.64/1.2/1.0) to provide a solution of 32% solids having a Brookfield viscosity of predominantly alkyl methacrylate polymer and a dispersed phase of rubbery, uniformly cross-linked predominantly alkyl acrylate polymer. As noted previously herein, the dispersed polymer has a maximum glass transition temperature of −20° C. and the continuous phase has a glass transition temperature above 30° C., preferably above 60° C., particularly 60° C. to 80° C. A method for producing the material is described and claimed in U.S. application Ser. No. 526,038, now abandoned. A typical preparation of this film is described herein as the illustrative embodiment of the present invention.

The exceptional laminate described above is characterized by high resistance to weathering. Various laminate combinations were prepared from films II and III, substrates W, X, and Z and adhesives A and B. These laminates and unlaminated substrates W, X and Z were subjected to accelerated exposure tests using both a Fade-Ometer and Weather-Ometer. The laminates showed relatively little change in color or physical properties as compared to the unprotected substrates.

Additional samples were prepared for 12-month exposure tests in Florida or Arizona. The test results are summarized in Table 4. In the table, the film, adhesive, and substrate are identified by the same designation used previously. Thus, for the laminate construction "III/B/W/B/III," high impact polystyrene Dow Styron 456 was faced on each side with pigmented film III using adhesive B (95% styrene/5% acrylonitrile, bulk polymerization to an intrinsic viscosity of 0.57 dl./gm. and applied to film III by extrusion coating). The first side identified is the exposed (upper) side.

TABLE 4

| Laminate construction | W/B/III | III/B/W/B/III | Z/B/III | III/B/Z/B/III | W/aluminum foil | III/A/W/aluminum foil | X/aluminum foil | III/AX aluminum foil |
|---|---|---|---|---|---|---|---|---|
| Adhesion (1=Excellent; 4=Poor): | | | | | | | | |
| Initial | | 1 | | 1 | | 1 | | 1 |
| 6 months exposure | | 1 | | 1 | | 1 | | 2 |
| 12 months exposure | | 1 | | 1 | | 2 | | 2 |
| Discoloration: | | | | | | | | |
| 6 months exposure | Severe | None | Severe | None | Bad | None | (¹) | None |
| 12 months exposure | Severe | None | Severe | None | Bad | None | (¹) | None |
| Tensile properties, ASTM D 638: | | | | | | | | |
| Elongation, percent: | | | | | | | | |
| Initial | 53 | 57 | 61 | 41 | 39 | 42 | 56 | 52 |
| 6 months exposure | 2 | 57 | 1 | 6 | 4 | 57 | 9 | 42 |
| 12 months exposure | 1 | 58 | 1 | 3 | 1 | 51 | 7 | 54 |
| Tensile strength, p.s.i.: | | | | | | | | |
| Initial | 3,700 | 3,900 | 4,400 | 4,100 | 4,000 | 3,500 | 3,400 | 3,300 |
| 6 months exposure | 2,500 | 3,900 | 3,800 | 4,500 | 2,500 | 3,600 | 2,500 | 3,000 |
| 12 months exposure | 2,500 | 3,700 | 3,500 | 5,000 | 2,300 | 3,600 | 2,500 | 3,000 |
| Tensile impact strength, ASTM D 1822, ft.-lbs./in.²: | | | | | | | | |
| Initial | 33 | 31 | 36 | 37 | 31 | 41 | 42 | 31 |
| 6 months exposure | 16 | 31 | 12 | 24 | 23 | 44 | 17 | 27 |
| 12 months exposure | 3 | 21 | 2 | 12 | 6 | 22 | 11 | 12 |

¹ Slight fading.

(spindle No. 2) of 110 cps. and a No. 2 Zahn cup viscosity of 57. The adhesive was applied to film III by a gravure coating process using a gravure coating roll of 110 lines/inch, a line speed of 90 feet/minute, and an oven temperature of 198° F. The product had a residual solvent content of 1.7% and the adhesive thickness was about 0.15 to 0.2 mil. Following the same general procedure except using a gravure coating roll of 85 lines per inch and an oven temperature of 188° F., a product was obtained having a residual solvent content of 2.8% and a coating thickness of 0.3 mils. Both products could be laminated to a polystyrene substrate in the manner described to provide a strongly adherent product.

By proper selection of film, substrate and adhesive, a laminate having exceptional weathering characteristics can be obtained. For this purpose, the substrate should be high impact polystyrene, and the adhesive should correspond to the preferred adhesive herein, viz, a polymer of at least 75% styrene, particularly 85% to 95% styrene, and at least 5%, and preferably 5% to 10% acrylonitrile. The adhesive most effective in the preferred embodiment of the invention contains no more than about 5% of other monomer species in the polymer. The film useful in the preferred embodiment comprises a heterogeneous polymeric composition comprising a continuous phase In addition to the foregoing, a laminate was prepared using a clear, general-purpose polystyrene containing a U.V. stabilizer (Styron 674, a product of Dow Chemical Co.) as the substrate, film I and adhesive A. The film-protected surface was the upper, exposed surface for testing purposes. The laminate exhibited good adhesion of the film to substrate. After six months exposure, the laminate exhibited no discoloration whereas the exposed, unprotected substrate was badly discolored. After twelve months, the laminate showed slight discoloration; the unprotected substrate was severely discolored beyond that at six months.

Examples of the utilization of the laminates of the present invention include outdoor advertising displays and warning signs, pipeline markers, identification tags, instruction plates, and the like. The laminates can be decorated and/or made resistant to sunlight, pollution and other environmental influences which normally would tend to degrade the unprotected substrate. By use of the specified adhesive, the laminate is stable and resists delamination.

I claim:

1. As an article of manufacture a laminate comprising (a) a polystyrene substrate; (b) a film having a bonding surface consisting essentially of polymeric material in which the predominant component is at least one alkyl methacrylate wherein the alkyl substituent contains from 1 to 4 carbon atoms and the balance is at least one member selected from the group consisting of acrylic acid, methacrylic acid, alkyl acrylates wherein the alkyl substituent contains from 1 to 8 carbon atoms and alkyl methacrylates wherein the alkyl substituent contains from 5 to 9 carbon atoms, said polymeric material having a glass transition temperature above 30° C. and characterized as formable into free film and non-blocking at storage temperature; and (c) an adhesive composition bonding said film and said polystyrene substrate, said adhesive composition comprising a polymer consisting essentially of at least 65% by weight styrene, at least 3% by weight acrylonitrile and the balance at least one member selected from the group consisting of acrylic acid, methacrylic acid, and alkyl esters of said acids wherein the alkyl substituent has up to 8 carbon atoms, said polymer having a glass temperature of at least 60° C. and an intrinsic viscosity in ethylene dichloride in the range of 0.2 to 0.9.

2. An article in accordance with claim 1 wherein substrate (a) is high impact polystyrene.

3. An article in accordance with claim 1 wherein the polymeric material of film (b) has a glass transition temperature in a range of about 60° C. to about 80° C.

4. An article in accordance with claim 1 wherein adhesive composition (c) comprises a polymer consisting essentially of at least 75% styrene and at least 5% acrylonitrile.

5. An article in accordance with claim 1 wherein adhesive composition (c) comprises a polymer consisting essentially of at least 85% to 95% styrene and at least 5% to 10% acrylonitrile and a maximum of 5% of other monomer species.

6. An article in accordance with claim 1 wherein substrate (a) is high impact polystyrene, wherein film (b) is a heterogeneous polymeric composition having as a continuous phase a predominantly alkyl methacrylate polymer having a glass transition temperature above 60° C. and as a dispersed phase a rubbery, uniformly crosslinked predominantly alkyl acrylate polymer having a maximum glass transition temperature of —20° C., and wherein adhesive composition (c) comprises a polymer consisting essentially of 85% to 95% styrene, 5% to 10% acrylonitrile and a maximum of 5% of other monomer species.

7. As an article of manufacture a film having a surface consisting essentially of polymeric material in which the predominant component is at least one alkyl methacrylate wherein the alkyl substituent contains from 1 to 4 carbon atoms and the balance is at least one member selected from the group consisting of acrylic acid, methacrylic acid, alkyl acrylates wherein the alkyl substituent contains from 1 to 8 carbon atoms and alkyl methacrylates wherein the alkyl substituent contains from 5 to 9 carbon atoms, said polymeric material having a glass transition temperature above 30° C. and characterized as formable into free film and non-blocking at storage temperature, said surface of said film having affixed thereto a substantially continuous coating of an adhesive composition comprising a polymer consisting essentially of at least 65% by weight styrene, at least 3% by weight acrylonitrile and the balance at least one member selected from the group consisting of acrylic acid, methacrylic acid, and alkyl esters of said acids wherein the alkyl substituent has up to 8 carbon atoms, said polymer having a glass temperature of at least 60° C. and an intrinsic viscosity in ethylene dichloride in the range of 0.2 to 0.9.

8. In the bonding of a film to a polystyrene substrate wherein a surface of said film is pressed against a surface of said substrate, then caused to adhere thereto, the improvement which comprises utilizing as said film a film having a bonding surface consisting essentially of polymeric material in which the predominant component is at least one alkyl methacrylate wherein the alkyl substituent contains from 1 to 4 carbon atoms and the balance is at least one member selected from the group consisting of acrylic acid, methacrylic acid, alkyl acrylates wherein the alkyl substituent contains from 1 to 8 carbon atoms and alkyl methacrylates wherein the alkyl substituent contains from 5 to 9 carbon atoms, said polymeric material having a glass transition temperature above 30° C. and characterized as formable into free film and non-blocking at storage temperature, and interposing between said bonding surface of said film and bonding surface of said substrate an adhesive composition comprising a polymer consisting essentially of at least 65% by weight styrene, at least 3% by weight acrylonitrile and the balance at least one member selected from the group consisting of acrylic acid, methacrylic acid, and alkyl esters of said acids wherein the alkyl substituent has up to 8 carbon atoms, said polymer having a glass temperature of at least 60° C. and an intrinsic viscosity in ethylene dichloride in the range of 0.2 to 0.9 prior to the pressing of said film against said substrate.

References Cited
UNITED STATES PATENTS

| | | | |
|---|---|---|---|
| 2,916,469 | 12/1959 | Lal | 161—256 |
| 2,921,045 | 1/1960 | Martino | 161—254 X |
| 2,990,306 | 6/1961 | Dyer | 161—254 X |
| 3,473,996 | 10/1969 | Whalen | 161—254 X |

JOHN T. GOOLKASIAN, Primary Examiner

C. B. COSBY, Assistant Examiner

U.S. Cl. X.R.

156—331, 332, 334; 161—252, 256; 260—31.2 N, 32.4, 80.8, 88.7, 93.5 A